R. G. STANBROUGH.
HANDPIECE FOR DENTAL ENGINES.
APPLICATION FILED FEB. 20, 1920.
1,388,617.
Patented Aug. 23, 1921.
2 SHEETS—SHEET 1.
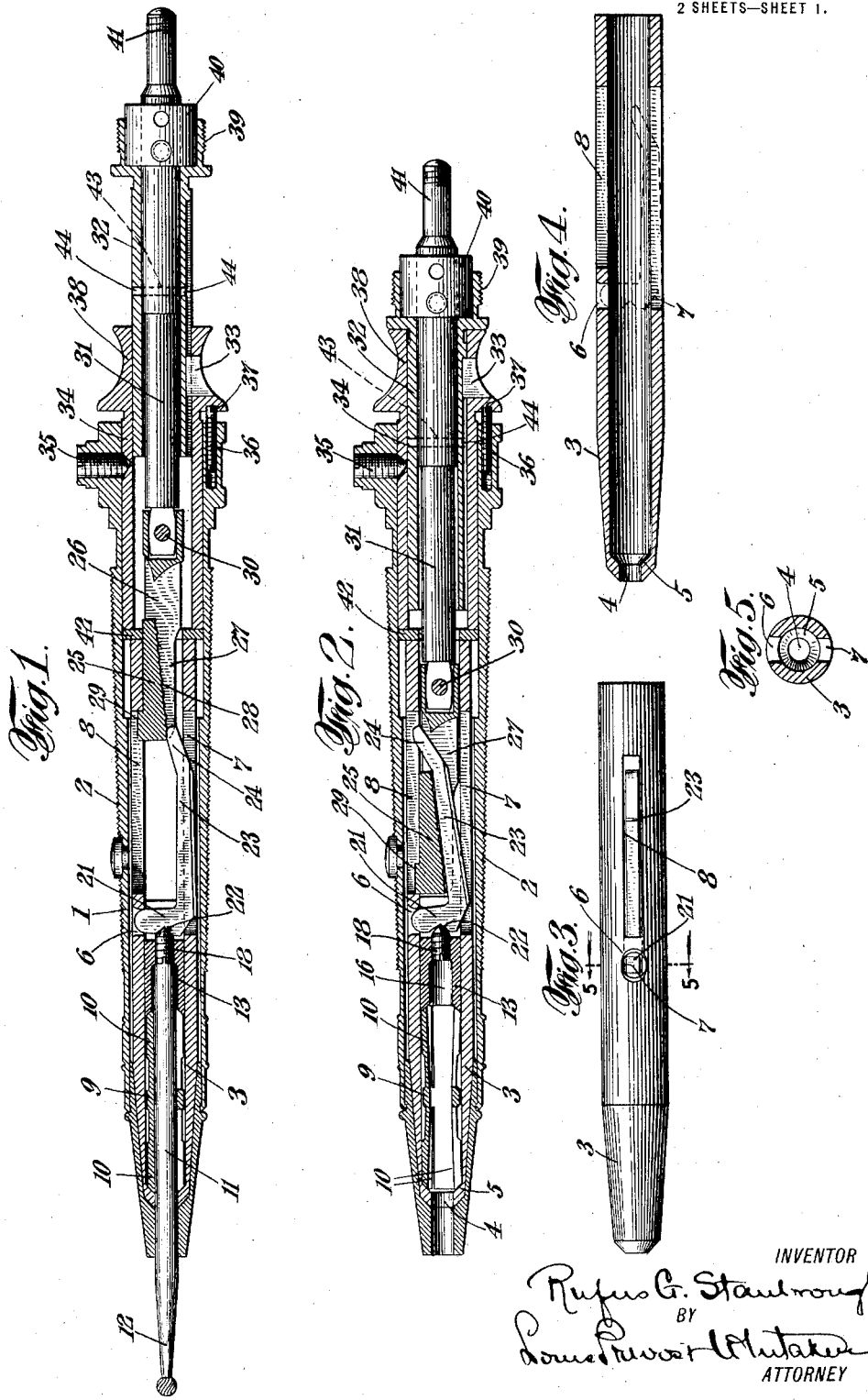
INVENTOR
Rufus G. Stanbrough
BY
Louis Prevost Whitaker
ATTORNEY R. G. STANBROUGH.
HANDPIECE FOR DENTAL ENGINES.
APPLICATION FILED FEB. 20, 1920.
1,388,617.
Patented Aug. 23, 1921.
2 SHEETS—SHEET 2.
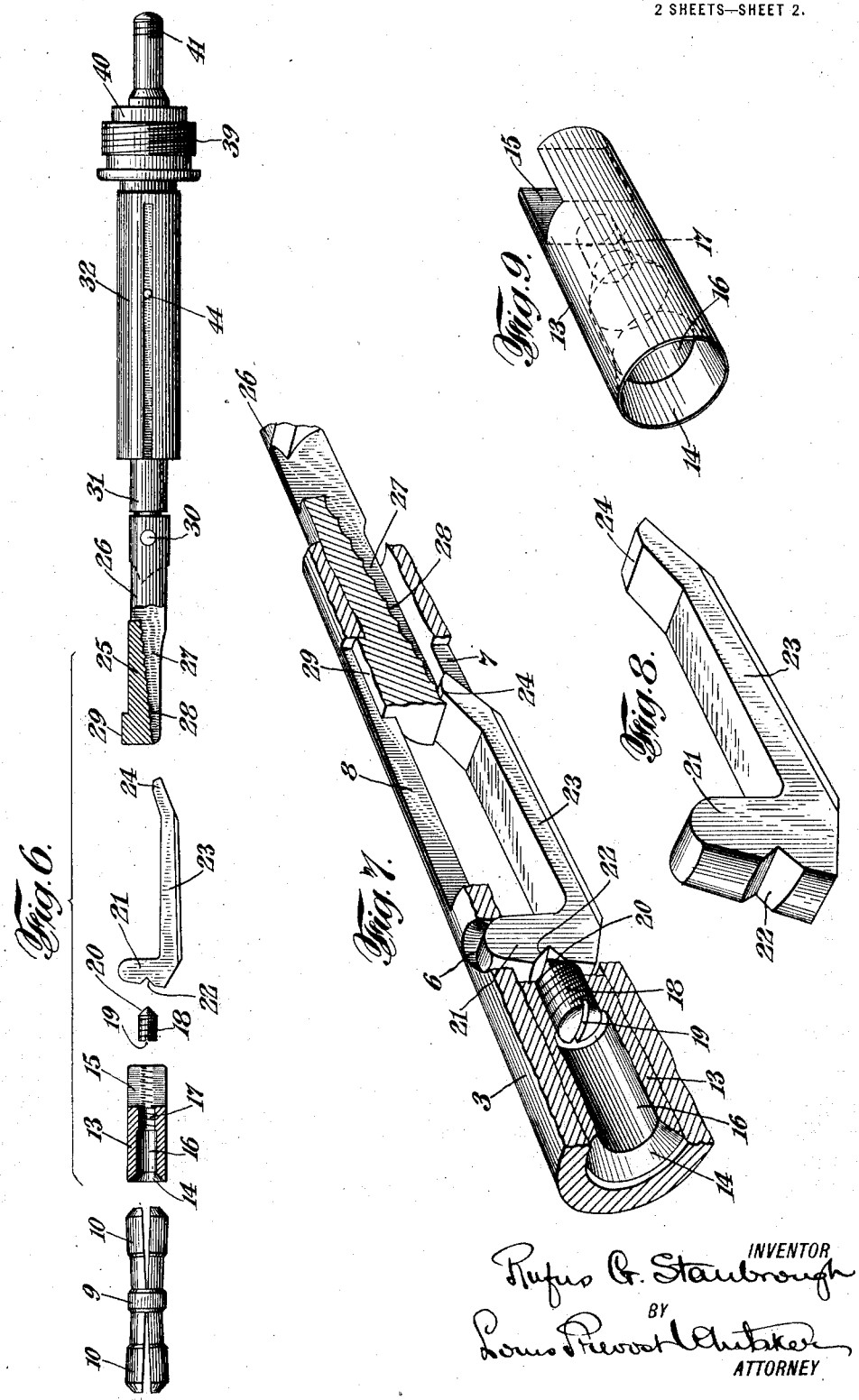
INVENTOR
Rufus G. Stanbrough
BY
Louis Prevost Whitaker
ATTORNEY

UNITED STATES PATENT OFFICE.

RUFUS G. STANBROUGH, OF NEW YORK, N. Y., ASSIGNOR TO MARGARET E. N. STANBROUGH, OF NEW YORK, N. Y.

HANDPIECE FOR DENTAL ENGINES.

1,388,617.  Specification of Letters Patent.  Patented Aug. 23, 1921.

Application filed February 20, 1920. Serial No. 360,032.

*To all whom it may concern:*

Be it known that I, RUFUS G. STANBROUGH, a citizen of the United States, residing at New York, in the county of New York and State of New York, have invented certain new and useful Improvements in Handpieces for Dental Engines; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention selected by me for purposes of illustration, and the said invention is fully disclosed in the following description and claims.

In the construction and manufacture of hand pieces for dental engines, it is customary to employ a bit holding device in the form of a double clutch provided at each end with spring jaws having conical exterior surfaces adapted to co-act with a stationary conical recessed portion near the outer end of the inner sleeve of the hand piece, and a similar recessed portion on a longitudinally movable chuck closer, operated by thrust movement to close the double chuck upon the drill or tool, and the chuck closer is ordinarily operated by means of a dog or lever of peculiar construction provided with a fulcrum portion having pivotal ears engaging recessed portions in the inner sleeve of the hand piece, a tail or lever movable laterally of the hand piece by means of a wedge piece, which is capable of movement longitudinally of the hand piece, the dog being provided with an angular shoulder to engage the chuck closer, to impart thrust movement thereto. This construction is objectionable in its operation in that the thrust of the dog is applied to the chuck closer at one side of its longitudinal axis, which tends to throw the chuck closer out of alinement with the longitudinal axis of the sleeve and to produce a bind of the chuck closer within said sleeve and interfere with the correct operation of the chuck, and further, the construction of the dog, which must be formed with the utmost nicety and accuracy, to produce the pivotal ears, the angular shoulder and the elongated tail or lever portion in a single piece of metal, is a very expensive operation requiring a succession of machine operations with tools and chucks thereby greatly increasing the cost of production of such hand pieces. Moreover, in the ordinary hand piece so constructed, there is no means for adjusting the device for the purpose of regulating the bite of the double chuck, or for the purpose of taking up wear, without disassembling the hand piece, such adjustment being ordinarily accomplished by means of washers interposed between portions of the chuck closing device, and such adjustment can only be made by removing the washer and replacing it with another of different thickness, while the hand piece is disassembled.

The objects of my invention are to simplify the construction and cheapen the cost of manufacture of such dental hand pieces, without in any way impairing their efficiency, and at the same time to provide for a ready adjustment of the hand piece, to vary the bite or clamping action of the double chuck and to compensate for wear, without disassembling the hand piece. To this end my improved invention contemplates a different form of dog in which the usual pivotal ears are dispensed with altogether, and the pivotal portion of the dog is located in the same plane as the other portions, whereby the dog can be produced by a simple die punching or stamping operation in one piece without any machining whatever. My invention contemplates the further provision of an adjustable screw disposed axially with respect to the chuck closer and engaging a notch or recess in the dog and serving to prevent lateral play of the dog and also to receive the thrust imparted by the dog to the chuck closer which is thereby actuated axially, thus preventing the possibility of binding in the sleeve. The adjustable screw in the chuck closer is also located so as to be accessible from the end of the hand piece through the space normally occupied by the shank of the drill or tool, so that the screw can be rotated without disassembling the hand piece, thus not only providing for the ready and instantaneous adjustment of the hand piece to accommodate slight variations in the diameters of the shanks of different bits or tools, and to take up wear of the parts, but this also assists materially in the assembling of the parts of the hand piece.

My invention also contemplates the provision on the chuck closer of a transversely disposed recessed portion to receive the angular or transversely disposed portion of the dog, for the purpose of preventing the relative rotation of the dog and chuck closer.

My invention also contemplates other advantageous features, all of which are hereinafter described and clearly pointed out in the claims.

Referring to the accompanying drawings, which illustrate one embodiment of my invention, selected by me for purposes of illustration, Figure 1 represents a sectional view partly in elevation of a dental hand piece embodying my invention, showing the same in operative position with respect to a bit or tool.

Fig. 2 is a similar view showing the parts in open position and the tool removed.

Fig. 3 is a detail plan view of the inner stationary sleeve of the hand piece carrying the chuck closer and dog.

Fig. 4 represents a longitudinal sectional view of the said sleeve shown in Fig. 3, the position of my improved dog being indicated in dotted lines.

Fig. 5 represents a transverse sectional view of the sleeve shown in Figs. 3 and 4.

Fig. 6 is a detail view partly in section, showing the double chuck, chuck closer, adjusting and abutment screw, the dog operating wedge piece, and parts connected therewith, in separated relation, to facilitate the understanding of my improved invention.

Fig. 7 represents an enlarged sectional view, partly in elevation, showing the relation of the chuck closer, dog, and wedge piece, in the stationary sleeve.

Fig. 8 is a detail perspective view of the dog detached.

Fig. 9 is a detail perspective view of the chuck closer detached.

Referring to the accompanying drawings, 1 represents the exterior casing of the hand piece, which is of ordinary construction and is preferably roughened on its exterior for a portion of its length, as indicated at 2, in the customary manner. Within the casing 1 is the rotary sleeve 3, shown in detail in Figs. 3, 4, and 5, which is provided at its outer end with an aperture 4 to receive the shank of a bit or drill, of smaller diameter than the interior of the sleeve, the sleeve being provided adjacent to the aperture 4, and inside of the sleeve, with a conical recess or seat 5, to receive the forward end of the chuck and compress the jaws thereof upon the shank of the drill or tool when the chuck is subjected to the thrust movement. The rotary sleeve 3 is also provided with an aperture 6 in its wall to receive the fulcrum end of the angular transverse portion of the dog, as indicated in dotted lines in Fig. 4, and the opposite side of the sleeve is provided with an elongated slot 7 to accommodate the tail portion of the dog and permit the necessary movement thereof. Adjacent to the aperture 6 the sleeve is also provided with another longitudinal slot, indicated at 8, to receive a stop lug on the wedge piece for operating the dog, and this slot 8, in conjunction with the said stop lug serves to limit the longitudinal movement of the wedge piece, while securing their joint rotation.

Within the sleeve 3 is a double chuck, indicated at 9, having its end portions substantially conical, and split longitudinally, in a well known way, so as to provide clamping jaws 10—10 for engaging the shank 11 of a bit or tool 12. Within the sleeve 3 is also located the chuck closer 13, shown detached in Fig. 7, and in perspective, enlarged, in Fig. 9. The chuck closer 13 is provided at its forward end with a conical recessed portion 14, for engaging the rear end of the double chuck, and at its rear end is provided with a transverse slot or recess 15 forming bifurcated portions between which the transverse portion of the dog lies, thereby preventing relative rotation between them. The chuck closer 13 is provided with a longitudinal central recess 16 communicating with an axial threaded aperture 17 in which is located a hardened screw 18, preferably of the same diameter throughout, and provided at its forward end with a notch 19 to receive a screw driver therefor, or other means for turning it, and at its rear end with a hardened point 20 for engaging the dog and receive the longitudinal thrust imparted by the dog and transmitted by the chuck closer to the chuck for closing the jaws thereof.

The clutch operating dog comprises a transversely disposed portion 21 provided on its forward face with a notch or recess 22 engaged by the screw 20, and a longitudinally disposed tail portion 23 provided with an inwardly extending bearing portion 24 for engaging the longitudinally movable wedge piece. It will be seen that this dog is of extremely simple construction, and that the tail portion and angular portion are in the same plane so that it can be formed by a simple punching operation in one piece without machining, and without the use of any other tools or hand labor, thus reducing the expense of such dog to an extremely small fraction of the cost of the ordinary dog, which has heretofore been one of the most expensive parts in the hand piece to manufacture. The outer end of the transverse portion 21 of the dog loosely engages the aperture 6 in the sleeve 3, as clearly shown in Figs. 1, 2, 3, and 4, and forms the fulcrum of the dog, the fulcrum bearing for the dog being the engagement of this transverse portion 21 with the rear edge of the aperture 6 (see Fig. 4), which is preferably rounded adjacent to such point of engagement, and the dog will be held from movement transversely of the sleeve, when in operative position, by the engagement of the screw 18, in the notch 22 of the dog (see Figs. 1 and 2). This construction provides a very ready means for assembling the parts, as the dog can be placed in the sleeve 3 while the screw 18 is adjusted to a forward position out of engagement with the dog, and after the parts of the hand piece are entirely assembled and the wedge piece, hereinafter described, is placed in position, the screw 18 can be screwed in to engage the recess 22 in the dog, and hold the parts in assembled position, as will be readily understood the bifurcated portions of the chuck closer extending on opposite sides of the dog and as the dog is held against rotation with respect to the sleeve by its engagement with the aperture 6, this construction holds the chuck closer against rotation while the screw 18 is turned for the purpose of assembling or disassembling, or adjusting the hand piece.

For operating the dog, the longitudinally movable wedge piece may be employed, the same being indicated at 25, and being formed on a shaft section 26, which is recessed or milled out in the usual manner, as indicated at 27, so as to form the inclined wedging surface 28, of roughened or step form. The shaft section 26 is also provided with a stop lug 29 which engages the slot 8 in the sleeve 3, as hereinbefore stated, the co-action of said lug 29 and slot 8 limiting the longitudinal movement of the wedge piece 25 and the engagement of the inclined surface 28 with the bearing portion 24 on the tail of the dog, serves to move the tail portion 23 laterally and impart a forward thrust to the screw 18, the chuck closer 14, and the double chuck, to close the jaws of the clutch. The shaft section 26 is preferably connected by a loose joint, indicated at 30, to a shaft 31, which extends through a longitudinally movable inner sleeve 32, or bearing sleeve, thus supporting the shaft and permitting it to rotate. The inner sleeve 32 slides longitudinally with said shaft members upon a key 33 in a supporting sleeve 34, to which the casing 1 is connected, in any usual or preferred way. In the present instance the casing 1 is shown as slipped over the supporting sleeve 34 and locked in position by a set screw 35, the sleeve and casing being further locked against relative rotary movement by interlocking means, comprising in this instance a screw 36 projecting from the rear end of the casing and fitting in a recess 37 in a boss or hub 38, formed on the rear end of the supporting sleeve.

The inner bearing sleeve 32 is provided at its rear end with a threaded portion 39 upon which is screwed the casing of the usual flexible shafting extending from the rotary member of the dental engine, or other driving means. The rear end of the shaft member 31, is provided with a bearing portion 40, lying within the threaded portion 39, said shaft section 31 being further provided with a threaded stem 41 which engages the rotary shaft of the driving means, in a well known way, for imparting rotary movement to the shaft section 31, the shaft section 26, the sleeve 3, and the tool clamped or held in said sleeve by the chuck, chuck closer, and dog, as will be readily understood.

In the operation of the device it will be understood that the parts are normally in the position shown in Fig. 2, the jaws of the clutch being open, the shaft sections 26 and 31 being in their most forward positions, with the stop lug 29 in engagement with the slot 8 in the rotary sleeve 3, and the dog occupying the position shown in Fig. 2. In this position it will be seen that a slender screw driver can be inserted longitudinally through the longitudinal tool receiving aperture and the screw 18 can be adjusted at any time to vary the clamping action of the chuck, to take up wear, or for any other purpose. After a drill shank or other tool is inserted in the chuck, as indicated in Fig. 1, the operator draws the shaft sections 31, 26, rearwardly, thereby bringing the wedge piece 25 into contact with the bearing portion 24 of the dog, and forcing the tail of the dog laterally, as shown in Fig. 1, thereby imparting a direct forward thrust on the screw 18 axially of the clutch closer 13, and closing the jaws of the clutch upon the tool. It will also be noted that by means of the said screw 18, operable as before described, the parts may be readily assembled by backing out the set screw 18 which gives a convenient opportunity to insert the dog in the sleeve 3, and the parts assembled in the casing 1, after which the screw 18 can be screwed to its proper position to engage the notch 22 in the dog and adjust the dog to effect the proper clamping action of the chuck.

In order to prevent any lateral motion of the shaft member 26, I prefer to provide a washer, indicated at 42, surrounding the shaft member 26 within the casing 1.

In order to prevent the rotation of the clutch closer and associated parts, including the inner sleeve 3 and shaft sections 31 and 26, while the screw 18 is being adjusted, means are provided for holding the said parts from rotation. In this instance I have shown the shaft section 31 provided with an aperture 43 adapted to be brought into registration with apertures 44 in the bearing sleeve 32, so that a bodkin or other pin or projection can be inserted in the said registration apertures 43, 44 when the sleeve and shaft are drawn rearwardly, as shown on Fig. 1, thus enabling the operator to hold the shaft 31 from rotary movement, and thus hold the shaft section 26 and sleeve 3 against rotation, while the screw 18 is adjusted.

What I claim and desire to secure by Letters Patent is:—

1. In a dental hand piece, the combination with a casing, a rotary sleeve in the casing, a clutch having a longitudinal tool aperture, and a longitudinally movable chuck closer in axial alinement with the chuck, of a dog for actuating the chuck closer, comprising an angular plate having a member disposed longitudinally of the sleeve and a member disposed transversely of the sleeve, the outer end of said transverse member having a fulcrum end in the plane of the longitudinal member and engaging an aperture in the wall of the sleeve, the said chuck closer, having a part in line with its longitudinal axis engaging the said transverse member, and actuating means for engaging the longitudinal member of the dog.

2. In a dental hand piece, the combination with a casing, a rotary sleeve in the casing, a chuck having a longitudinal tool aperture, and a longitudinally movable chuck closer, in axial alinement with the chuck, of a dog for actuating the chuck closer, comprising an angular plate having a member disposed longitudinally of the sleeve and a member disposed transversely of the sleeve, the outer end of said transverse member having a fulcrum end in the plane of the longitudinal member and engaging an aperture in the wall of the sleeve, such chuck closer and said transverse arm being provided, the one with a recess and the other with a screw engaging said recess having its axis coincident with the axis of the chuck closer for holding said dog from movement transversely of the sleeve, and transmitting pressure to the chuck closer axially thereof, and actuating means for engaging the longitudinal arm of the dog.

3. In a dental hand piece, the combination with a casing, a rotary sleeve in the casing, a chuck having a longitudinal tool aperture, and a longitudinally movable chuck closer, in axial alinement with the chuck, of a dog for actuating the chuck closer, comprising an angular plate having a member disposed longitudinally of the sleeve and a member disposed transversely of the sleeve, the outer end of said transverse member having a fulcrum end in the plane of the longitudinal member, and engaging an aperture in the wall of the sleeve, said transverse member being provided with a recessed portion, said chuck closer being provided with a longitudinal axial aperture communicating with the aperture in the chuck, and a screw located in a threaded portion of said aperture, and engaging the recess in the transverse member of the dog, to hold the dog from lateral movement in the sleeve and to transmit pressure axially to the chuck closer, and means for actuating the longitudinal member of the dog.

4. In a dental hand piece, the combination with a casing, a rotary sleeve in the casing, a chuck having a longitudinal tool aperture, and a longitudinally movable chuck closer, in axial alinement with the chuck, of a dog for actuating the chuck closer, comprising an angular plate having a member disposed longitudinally of the sleeve and a member disposed transversely of the sleeve, the outer end of said transverse member having a fulcrum end in the plane of the longitudinal member, and engaging an aperture in the wall of the sleeve, said transverse member being provided with a recessed portion, said chuck closer being provided with a longitudinal axial aperture communicating with the aperture in the chuck, and a screw located in a threaded portion of said aperture, and engaging the recess in the transverse member of the dog, to hold the dog from lateral movement in the sleeve and to transmit pressure axially to the chuck closer, means for preventing the rotation of the chuck closer with respect to said sleeve, and means for actuating the longitudinal member of the dog.

5. In a dental hand piece, the combination with a casing, a rotary sleeve in the casing, a chuck having a longitudinal tool aperture, and a longitudinally movable chuck closer, in axial alinement with the chuck, of a dog for actuating the chuck closer, comprising an angular plate having a member disposed longitudinally of the sleeve and a member disposed transversely of the sleeve, the outer end of said transverse member having a fulcrum end in the plane of the longitudinal member, and engaging an aperture in the wall of the sleeve, said transverse member being provided with a recessed portion, said chuck closer being provided with a longitudinal axial aperture communicating with the aperture in the chuck, and a screw located in a threaded portion of said aperture, and engaging the recess in the transverse member of the dog, to hold the dog from lateral movement in the sleeve and to transmit pressure axially to the chuck closer, said chuck closer being provided with bifurcated portions, extending on opposite sides of the dog and preventing the rotation of the chuck closer in turning said screw, and means for actuating the longitudinal member of the dog.

In testimony whereof I affix my signature.

RUFUS G. STANBROUGH.